United States Patent
Kreidler

(10) Patent No.: US 10,990,078 B2
(45) Date of Patent: Apr. 27, 2021

(54) COMPUTER-IMPLEMENTED METHOD FOR PART ANALYTICS OF A WORKPIECE MACHINED BY AT LEAST ONE CNC MACHINE

(71) Applicant: Cloudbased Industry 4.0 Technologies AG, Stans (CH)

(72) Inventor: Volker Kreidler, Hechingen (DE)

(73) Assignee: BIG DATA IN MANUFACTURING GMBH, Hechingen (DE)

( * ) Notice: Subject to any disclaimer, the term of this patent is extended or adjusted under 35 U.S.C. 154(b) by 0 days.

(21) Appl. No.: 15/521,559

(22) PCT Filed: Oct. 30, 2015

(86) PCT No.: PCT/CH2015/000159
§ 371 (c)(1),
(2) Date: Apr. 24, 2017

(87) PCT Pub. No.: WO2016/065492
PCT Pub. Date: May 6, 2016

(65) Prior Publication Data
US 2017/0308057 A1    Oct. 26, 2017

Related U.S. Application Data

(60) Provisional application No. 62/073,350, filed on Oct. 31, 2014, provisional application No. 62/073,381, (Continued)

(51) Int. Cl.
*G05B 19/4069* (2006.01)
*G05B 19/418* (2006.01)

(52) U.S. Cl.
CPC ... *G05B 19/4069* (2013.01); *G05B 19/41875* (2013.01); *G05B 2219/23456* (2013.01);
(Continued)

(58) Field of Classification Search
None
See application file for complete search history.

(56) References Cited

U.S. PATENT DOCUMENTS

| 4,878,002 A | 10/1989 | Heatzig et al. |
| 6,242,880 B1 * | 6/2001 | Hong .................. G05B 19/416 318/571 |

(Continued)

FOREIGN PATENT DOCUMENTS

| CN | 1122018 A | 5/1996 |
| CN | 101145047 A | 3/2008 |

(Continued)

OTHER PUBLICATIONS

International Search Report and Written Opinion—PCT/CH2015/000160—dated Feb. 17, 2016.
(Continued)

*Primary Examiner* — Ryan A Jarrett
(74) *Attorney, Agent, or Firm* — Banner & Witcoff, Ltd.

(57) ABSTRACT

One or more aspects of the present invention relate to a computer-implemented method for part analytics, in particular for analyzing the quality, the machining process and preferably the engineering process, of a workpiece machined by at least one CNC machine. According to these aspects, the method may include providing a digital machine model of the CNC machine with realtime and non-realtime process data of the at least one CNC machine, the realtime and non-realtime process data being recorded during the machining process of the workpiece under consideration; and subsequently simulating the machining process under consideration by means of the digital machine model based at least partially on the recorded realtime and non-realtime process data.

21 Claims, 4 Drawing Sheets

Related U.S. Application Data filed on Oct. 31, 2014, provisional application No. 62/073,461, filed on Oct. 31, 2014, provisional application No. 62/073,398, filed on Oct. 31, 2014.

(52) U.S. Cl.
CPC .............. *G05B 2219/32221* (2013.01); *G05B 2219/34038* (2013.01); *G05B 2219/35308* (2013.01); *G05B 2219/35311* (2013.01); *G05B 2219/35499* (2013.01); *G05B 2219/37* (2013.01); *G05B 2219/37576* (2013.01)

(56) References Cited

U.S. PATENT DOCUMENTS

| | | |
|---|---|---|
| 6,428,252 B1 | 8/2002 | Oldani |
| 6,535,788 B1 * | 3/2003 | Yoshida ............ G05B 19/40931 |
| | | 700/191 |
| 2002/0091460 A1 | 7/2002 | Allen |
| 2004/0162887 A1 | 8/2004 | Dillon et al. |
| 2005/0004707 A1 | 1/2005 | Kazi et al. |
| 2005/0113963 A1 | 5/2005 | Cho et al. |
| 2007/0046677 A1 | 3/2007 | Hong et al. |
| 2008/0313228 A1 | 12/2008 | Clark et al. |
| 2009/0299509 A1 | 12/2009 | Diezel et al. |
| 2010/0257228 A1 | 10/2010 | Staggs et al. |
| 2011/0248821 A1 | 10/2011 | Merten |
| 2013/0044115 A1 * | 2/2013 | Oyama .............. G05B 19/4068 |
| | | 345/473 |
| 2013/0124465 A1 | 5/2013 | Pingel et al. |
| 2013/0211555 A1 | 8/2013 | Lawson et al. |
| 2013/0251342 A1 | 9/2013 | Park et al. |
| 2014/0277686 A1 | 9/2014 | Wang et al. |
| 2016/0275133 A1 | 9/2016 | Moore |

FOREIGN PATENT DOCUMENTS

| | | |
|---|---|---|
| CN | 101278243 A | 10/2008 |
| CN | 101546184 A | 9/2009 |
| CN | 101615038 A | 12/2009 |
| CN | 102138110 A | 7/2011 |
| CN | 202135167 U | 2/2012 |
| CN | 102398226 A | 4/2012 |
| CN | 102449617 A | 5/2012 |
| CN | 102929219 A | 2/2013 |
| CN | 103337150 A | 10/2013 |
| CN | 103348694 A | 10/2013 |
| DE | 102004052790 B3 | 6/2006 |
| EP | 2538288 A2 | 12/2012 |
| EP | 2538290 A2 | 12/2012 |
| JP | 2013191128 A | 9/2013 |

OTHER PUBLICATIONS

International Search Report—PCT/CH2015/000158—dated Feb. 22, 2016.

International Search Report—PCT/CH2015/000159—dated Feb. 17, 2016.

Weck et al "Machine tools 4—Automation of machines and systems" 6th edition, Springer-Verlag Berlin Heidelberg 1995, 2001, 2006.

Oct. 8, 2019—(CN) Office Action—App 201580059058—Eng Tran.

* cited by examiner

COMPUTER-IMPLEMENTED METHOD FOR PART ANALYTICS OF A WORKPIECE MACHINED BY AT LEAST ONE CNC MACHINE

CROSS-REFERENCE TO RELATED APPLICATIONS

This application is a U.S. National Stage application under 35 U.S.C. § 371 of International Application PCT/CH2015/000159 (published as WO/2016/065492 A1), filed Oct. 30, 2015, which claims priority to U.S. Provisional Application No. 62/073,350 filed Oct. 31, 2014, U.S. Provisional Application No. 62/073,381 filed Oct. 31, 2014, U.S. Provisional Application No. 62/073,398 filed Oct. 31, 2014, and U.S. Provisional Application No. 62/073,461 filed Oct. 31, 2014. Benefit of the filing date of this prior application is hereby claimed. This prior application is hereby incorporated by reference in its entirety.

The present invention relates to a computer-implemented method for part analytics, in particular for analyzing the part quality, the machining process and preferably the engineering process, of a workpiece machined by at least one CNC (Computer Numerical Control) machine.

CNC machines referred to in the present invention typically comprise at least one machining tool movable along a tool path driven by one or a plurality of drive axes. The machining process is controlled by a given NC (Numerical Control) program defining at least a tool path for the at least one machining tool and a path velocity along the tool path.

The complete engineering and machining process of a workpiece to be machined by such a CNC machine consists of a number of sub-processes. For example, considering the engineering and manufacturing process of a steam turbine blade, after the turbine blade has been designed, e.g. with regard to a good fluid dynamic, a geometrical CAD (Computer Aided Design) model is generated. In the next phase, i.e. CAM (Computer Aided Manufacturing) programming, it is evaluated and decided by what manufacturing technology the part is to be manufactured, e.g. using a 5-axes CNC milling machine. Based on this decision, the CAM system generates a 3-dimensional tool path comprising a tool-center point path and the related tool-vectors. In the next step, the technological parameters such as spindle revolution and path-velocity are defined. Then, after having decided on the specific target machine used to machine the workpiece, a post processor compiles the data of the CAM system into a CNC machine specific NC program. The CNC controller of the milling machine interprets and interpolates the NC program and generates commanded values like position, velocity, acceleration and current for each of the five machine axes. After CNC milling process has been finished, the workpiece is moved to a 3D-coordinate measuring machine to check functional dimensions, surfaces and distances by considering defined tolerances.

Each of these sub-processes holds the potential for inducing errors and further problems which at the end may lead to parts being out of the defined tolerance. Some of the parts may be reworked, some are just waste. Today, each sub-process is an isolated independent engineering solution, also driven by the fact that the different technologies being used (software and machines) are provided by different vendors which so far do not collaborate with each other towards a fully integrated solution. Typically, each sub-process is optimized individually, without considering the consequences for the subsequent steps. Only after executing all sub-processes, the overall consequences of the problems become visible with regard to the finished part. In practical life, the whole process can be considered as a multiple trial-and-error approach wherein a number of parameters are changed, e.g. by adapting the CAD-model, by changing the manufacturing strategy or parameters or by adapting machine parameters. After each change, the part is sent again to the measuring machine and is checked if the part is within the defined tolerances. Until a part is matching the quality requirements, this trial-and-error approach may be very time and cost intensive. Moreover, the machine should ideally be used as a production device only, rather than as a programming device.

Considering the complete process chain from part-engineering to part-machining, one may identify errors occurring on the level of the sub-processes and errors occurring on the level of the complete process. In the sub-process of CAD, problems may be raised for example when different CAD surfaces do not comprise tangential continuity at the transition between two adjacent CAD surfaces. For the subsequent CAM programming and CNC machining, this means that the generated tool path has a non-linear behavior regarding path velocity, path acceleration and path jerk. As a consequence, the machine is excited by high accelerations and decelerations forcing the CNC controller to slow down the path velocity. In addition, the mechanics of the CNC machine wears out pretty fast. At the same time, this machine reaction also leads to a wear-out of the cutters causing additional costs with regard to the manufacturing costs. As a consequence, many waste parts or at least parts with a surface roughness out of tolerance are produced.

Problems caused by CAM programming are for example unfavorable angles between cutter and part leading to vibrations and bad surfaces and a high wear-out of the cutters. The programmed tool path can also lead to collisions between milling spindle and attached cutter on the one side and workpiece, machine or fixtures and the other side. Also with regard to the sub-process of CAM programming, unfavorable parameters such as unfavorable spindle speeds and path velocities may lead to disadvantageous cutting conditions causing bad part surfaces and wear-out of the tool.

In the sub-process of CNC machining, a number of problems may occur while the CNC controller is processing the NC program. Typical post processors generate or approximate the tool path by linear NC blocks. If the linear NC blocks become very short, the CPU (central processing unit) of the CNC controller is forced to its limits. In this cases, the CNC controller reacts on this problem by reducing the velocity which again generates problems with the regard to the part surfaces. As to 5-axes CNC machines, one may observe that the tool vector is changing its angle in space rapidly or is even oscillating which may again cause bad part surfaces. Furthermore, when the CNC controller generates commanded values for the five axes, drives and motors, it may happen that the five axes have quite different dynamical properties. The interaction between the five electrical drives and the mechanical behavior of the axes can cause problems such that the machine cannot exactly follow the commanded position and velocity values which again is reducing the part quality.

In conclusion, it can be stated that the problems of the complete process chain is not just the sum of all sub-process problems but individual problems may superpose, amplify or diminish each other. Solutions for a systematic error analytic and elimination over the full process chain from the engineering process to the actual machining process of a workpiece are not available yet.

As of today, quality control of parts/workpieces manufactured by a CNC machine takes place by visual inspection, using special measuring devices or 3D-coordinate measuring machines. With regard to the above described problems occurring in the complete process chain, the end user of the CNC machine has serious difficulties for a systematic error analytic and elimination if the quality control result does not match the defined quality requirements. The user typically can check if the tool path is correct, if the cutter compensation uses the appropriate settings or if the configuration parameters of the CNC controller and drives are correct. But in real life, this measures are more or less trial-and-error. Conventional approaches for error-detection and elimination are quite time consuming and do not achieve good part qualities at the end. In that case, the end user has to ask for additional support by the machine builder and/or the vendor of the automation components. The machine builders use special diagnostic tools which are not available for the end user. The machine builder checks if all machine data in the CNC controller are set in the required way. In a second phase of diagnostics, the machine may be equipped with acceleration sensors allowing to detect machine vibrations or other process specific sensors. The analysis of machine vibrations is then used to optimize the machine data of the CNC machine. In some cases, even the machine builder is not able to detect the machine and quality problems. At this stage, the automation and drive vendors typically get involved. Most of the CNC controllers provide realtime data recording software. The recording software is switched on at the NC start of machining by manually set triggers and the behavior of controllers, drives and sensors is recorded. Yet, today's recording functions are very limited. Typically, realtime data can be recorded only for a period of a few seconds. As a conclusion, today's procedures for analyzing part defects—expressed in bad part quality—are very time consuming and moreover unsuccessful in a lot of cases.

Apart from that, with regard to today's series and mass production in discrete manufacturing, the process of manufacturing and the process of measurement and quality control are completely separated from each other. First, the raw blank part is positioned in the machine and subsequently machined. Usually, there is no measurement within the machine, except for some cases of in-process-measurements. The latter may comprise simple measurements such as the position of a hole. The reason for omitting series measurements within the manufacturing machine is due to the loss of productivity. If for example a tactile sensor is inserted into the milling spindle, the machine can measure but not machine. Therefore, the measuring times are not productive and the part manufacturing cycles are increased. The most common way to do part measuring is to transfer the finished part to a measuring device. The disadvantage of this approach is the fact that manufacturing and measuring are two pretty much disconnected processes. As an example, in the aerospace or mold and die industry the parts are very complex, such that it sometimes takes days and even weeks to measure a part. Parallel to the measuring process, manufacturing continues to work. If problems are detected after this period, it may happen that some parts do not meet the quality requirements and need to be reworked or even are waste. In conclusion, there are no technologies available today being able to measure the geometrical shapes and surfaces or surface roughness of a workpiece in-process or immediately after the machining process, respectively, in order to yield analysis information about the quality of parts/workpiece immediately or shortly after the machining process.

Hence, it is an object of the present invention to provide a method for part analytics, in particular for analyzing the quality of a workpiece machined by at least one CNC machine yielding information about the quality of parts/workpiece immediately or shortly after the machining process. Preferably, the method should also allow for analyzing the machining process and preferentially also for analyzing the engineering process of the workpiece machined by the at least one CNC machine, hence to allow a systematic error analysis and possibly error elimination over the full process chain from engineering over machining to the finished workpiece.

According to the invention, this object is achieved by the computer-implemented method of claim 1. Advantageous embodiments of the invention are subject-matter of the dependent claims.

The method according to the present invention comprises:
a. providing a digital machine model of the CNC machine with realtime and non-realtime process data of the at least one CNC machine, the realtime and non-realtime process data being recorded during the machining process of the workpiece under consideration; and
b. simulating the machining process under consideration by means of the digital machine model based at least partially on the recorded realtime and non-realtime process data.

As of today, machine tool builders use digital machine models during the development of new machines to simulate the behavior of the machines and to check whether the machines fulfill the specified requirements. For instance, multibody-simulation models or finite-element-method (FEM) models are used to examine the motion and vibration behavior of the complete machine, hence, to identify typical problems arising by mechanical components. For this, the digital simulation is simulating the machine movement defined by the target/commanded tool paths, speeds, accelerations and jerks.

The present invention provides a new approach. The actual machining process using the real physical machine is started and during the machining process under consideration realtime and non-realtime process data of the at least one CNC machine, such as the actual geometrical tool path parameters, e.g. actual axis positions, speeds, accelerations and jerks, are continuously recorded over the machining process of the workpiece. According to the present invention, these recorded realtime and non-realtime data of the real process are used as input data to the digital machine model for simulating the machining process under consideration, thereby enabling for analyzing the quality of the machined workpiece and, moreover, in general to find a wide spectrum of problems on the parts and to relate them at least to typical problems with regard to the machine and the machining process. Hence, using digital machine models provided with realtime and non-realtime process data recorded over the full machining process of the workpiece for quality, machine and process diagnostics is one of the key feature of the present invention.

The machining process under consideration may preferably be the full machining process of the workpiece according to a NC program, e.g. starting with a blank part and ending with the finished workpiece. Alternatively, the machining process under consideration may only be a period under consideration of the full machining process. This may be the machining process according to a specific NC program block or the machining process of a specific machining tool within an overall machining process including several sub-process using different machining tools.

According to a first embodiment of the invention, the machine model may be a kinematic model, a multibody-simulation model or a finite-element-method (FEM) model of the CNC machine. The kinematic model solely reflects the geometric behavior of the machine. It represents an ideal rigid machine, wherein the individual moveable parts (axes, slides) of the machine follow exactly the recorded positions. Kinematic models are exclusively characterized by the geometric dimensions and include no additional physical properties of the real machine. In particular, kinematic models consider neither deformations, such as deflection, nor vibrations nor other mechanical deformations. Even joints are solely represented by positions. In contrast, multibody-simulation models are able to model the interaction of a plurality of mechanical moveable bodies represented by single movable masses which are connected by elastic joints. Yet, shapes of the machine parts are not changed. FEM models are similar to multibody-simulation models but more detailed and sophisticated. This is due to the fact that they are built up by a large number of small volumes with suitable masses, wherein adjacent volumes are connected to each elastically.

As to the data to be recorded, the recorded realtime process data may primarily include tool path parameters, in particular at least one of a commanded and/or actual position, a commanded and/or actual speed, a commanded and/or actual acceleration, a commanded and/or actual jerk, a commanded and/or actual torque, a commanded and/or actual drive force and/or a commanded and/or actual drive current with regard to at least one linear or rotary drive axis. In addition or alternatively, the recorded realtime process data may include a process-related force, torque, pressure, torsion, deflection, strain, vibration, temperature, energy distribution and/or energy consumption of at least one part of the CNC machine.

In order to enhance the quality of the simulation, the realtime process data are preferably to be recorded at a sampling rate according to the lowest cycle-time level of the CNC controller. In particular, the data capturing and recording may occur at a sampling rate according to the lowest loop-time level of the fastest sub-controller in case the controller comprises several sub-controllers, preferably according to the loop-time level of the position loop controllers. Numerically, recording of the realtime process data may occur at a sampling rate of at least 20 Hz, in particular of at least 33 Hz, preferably of at least 50 Hz, most preferably of at least 100 Hz. Or vice versa, the sampling time is at most 50 ms, in particular at most 30 ms, preferably at most 20 ms, most preferably at most 10 ms.

The recorded non-realtime process data may include a NC (Numerical Control) program code and/or NC program configuration data, in particular a respective active NC program line or NC block. Furthermore, the recorded non-realtime process data may include machine configuration data, e.g. geometrical data and/or dynamical data of each of the one or the plurality of drive axes such as the maximum axis-velocity and the maximum axis-acceleration of each drive axis, and/or a compensation table for the CNC machine. The recorded non-realtime process data may also include controller configuration data, e.g. tolerances of rounding/smoothing functions, and/or drive configuration data, e.g. the maximum drive current or the maximum drive force. The recorded non-realtime process data may further include material properties of the workpiece, user actions during the machining process and/or configuration data of the processing tool, in particular tooling geometry and/or tooling characteristic, e.g. material removal characteristics, maximum cutting speed, maximum cutting load/force/volume, number of cutting dents, maximum laser power etc.

These realtime and non-realtime process data typically originate from the CNC controller. However, some data may also be directly provided by the at least one electrical drive and/or by the at least one actuator of the CNC machine used to drive the processing tool with regard to a respective linear or rotary drive axis and/or by at least one machine-embedded measuring device of the CNC machine and/or by at least one external measuring device monitoring at least one process parameter of the CNC machine.

According to another embodiment of the invention, the digital machine model may also be provided with non-realtime data that are not recorded during the machining process, but which may be provided independent from the currently ongoing machining process. In principle, these data may comprise all non-realtime data mentioned above apart from the NC program code and/or NC program configuration data, in particular a respective active NC program line or NC block.

Preferably, the realtime and non-realtime data, in particular those originating from different sources and/or different time regimes (realtime versus non-realtime) are contextualized or mapped to each other. This means, the recorded data may comprise any metadata, such as a time tag, allowing to map or refer the realtime data to the non-realtime data and/or to map refer data from one data source to data form another data source. "Referring" or "mapping" means that all data are in context or conjunction with each other, thus providing the basis to properly identify any causal connection or relation of cause and effect. For example, considering non-realtime data comprising NC program lines and realtime data including information of the tool path, e.g. actual positions of the drive axis. The latter allow to re-engineer the surface of the machined workpiece as will be described later on. Having the non-realtime data on the NC program and the realtime data on the tool path being mapped to each other may allow to allocate a possibly erroneous NC program line to a specific defect on the workpiece surface.

In order to enable any analysis with regard to the engineering process, the method may further include providing engineering data of the workpiece to be machined, in particular data with regard to the engineering steps CAD (Computer Aided Design), CAM (Computer Aided Manufacturing) and post processing of CAM output, the engineering data comprising at least one of:

CAD data, including a CAD model of the workpiece; and/or

CAM data, including machining strategies (e.g. cutting strategies), tool data, operation sequences for tool compensation, settings of smoothing functions, strategy for workpiece fixture, model data of the blank the workpiece is to be machined from, ideal tool path derived from the CAM system provided with the CAD model of the workpiece; and/or post processor data, in particular settings with regard to process-improving CNC functionalities, e.g. interpolation types, selection of speed and/or acceleration profiles, settings/selection of smoothing functions, tool orientation programming, interpolation functions, or machine error compensation methods, and/or;

CNC data, including settings with respect to machine error compensation methods and to the adaption of parameters, e.g. tolerances, jerk limits, for smoothing the tool paths, parameter settings for damping functions, data with respect to feed forward or momentum control.

According to another embodiment of the invention, simulating the machining process of the CNC machine may be implemented as a server application on at least one server of an internal network or of an open network, e.g. the internet, in particular as a cloud-based service or a cloud-based application residing on a cloud platform or a machine near local server. According to this embodiment, the recorded realtime and non-realtime data as well as the engineering data are provided/transferred to that server/cloud or local platform, e.g. uploaded via internet or the internal network.

According to another embodiment of the invention, the method may further comprise recording the realtime and non-realtime process-related data prior to providing the digital machine model with the recorded data. The problem of today's realtime data recording is the limited capability of the CNC-controllers to record this high amount of data and to pre-process the data for uploading to the cloud/local-platform. Today's technology can only record a few seconds of the machining process. However, the approach of the present invention requires that the realtime data recording preferably covers the complete machining process. Hence, according to a preferred embodiment of the invention, recording the realtime and non-realtime process data as well as providing the digital machine model with that data may be achieved by using a client device as disclosed in the U.S. provisional patent application U.S. 62/073,398, titled "Big Data-Client for Embedded Systems", and as disclosed in the international patent application under PCT, titled "A client device for data acquisition and pre-processing of process-related mass data from at least one CNC machine or industrial robot", filed on Oct. 30, 2015 by the same applicant as of US 62/073,398 and the present application. The client device disclosed therein is configured for acquisition and pre-processing of process-related mass data from at least one CNC machine as well as for transmitting said process-related mass data to at least one data recipient, in particular to a cloud-platform for data analysis by software applications implemented/running thereon. For this, the client device comprises a first data communication interface to the CNC controller of the machine for continuously recording above mentioned realtime process data via at least one realtime data channel and for recording above mentioned non-realtime related data via at least one non-realtime data channel. To make the recorded realtime and non-realtime data available for recording, a data providing function may be implemented in the CNC controller that is in data communication with the client device. The client device further comprises a second data communication interface for transmitting the recorded process data to the server. The client device is also configured to pre-process the recorded data before transmission to the server. Pre-processing the recorded data primarily may include contextualizing the recorded realtime and non-realtime data which is important to enable the identification of causalities between e.g. an erroneous NC program and a defect on the workpiece. For this specific task, it is essential to refer the realtime axes positions of the CNC machine to the non-realtime active NC program code line. Hence, the client device may comprise at least one data processing unit for data-mapping at least the recorded non-realtime data to the recorded realtime data to aggregate a contextualized set of process-related data.

As mentioned above, the method may further comprise pre-processing of the recorded realtime and non-realtime process data, and preferably pre-processing of the engineering data, prior to providing the digital machine model with that data. Apart from contextualizing, pre-processing may preferably comprise at least one of compressing, encrypting, aggregating, filtering, or re-formatting the recorded realtime and non-realtime process data and preferably the engineering data. This pre-processing may also be accomplished by the client device referred to above.

In case mass data is to be recorded, the client device may be a so-called fat client, i.e. a stand-alone computer separate from the CNC controller and the cloud-based server as a separate computer provides more processor-performance and more memory. Alternatively, in case of small data volumes, the client device may be a so-called thin client, that may be part of the CNC controller or may be installed locally.

The machine model, e.g. the multibody or a FEM-simulation, represents an ideal machine. During the production of the machine parts and the assembly process of the machine parts different tolerances make each physical machine highly individual. In addition to this, machine data in the CNC controller, configuration data of the machine, drives, software, and communication are not identical in real life. Therefore, as pre-stage before starting the simulation, the model machine is to be individualized or adapted to the specific physical machine. For this adaption process, the real CNC machine data including configuration data of the controller, drives, motors and sensors as well as the geometrical measuring data of the machine are provided to the digital machine model for synchronization. Hence, according to another embodiment of the invention, the method further includes individualizing and/or calibrating the digital machine model with regard to the actual configuration of the specific CNC machine prior to using the digital machine model for simulating the machining process.

As a first stage of simulation, simulating the machining process may include calculating the actual tool path of the processing tool of the CNC machine by means of the digital machine model based on the recorded realtime and non-realtime process data. Most easily, the actual tool path may be calculated by providing a kinematic model of the CNC machine with the actual positions of the drive axes.

As a second stage of simulation, simulating the machining process may include virtually re-engineering the workpiece machined during the recorded machining process based on the recorded realtime and non-realtime process data. For example, re-engineering a workpiece machined by a milling machine can be realized by calculating the tool path of the processing tool of the CNC machine as described above. Subsequently, the geometry and milling characteristic of the milling tool is considered, which has been provided as non-realtime data, to re-engineer the workpiece surfaces along the recorded/calculated real tool paths. This virtual re-engineering of the workpiece may simply base on a material removal simulation basically known from prior art. For other machining process, such as material deposition processes, re-engineering of the workpiece may base on a material addition simulation.

With regard to one of the applications of the presented method, namely, for quality analysis of workpieces manufactured by the CNC machine, a preferred embodiment of the method may further include comparing the calculated tool path with an ideal tool path derived from a computer-aided manufacturing (CAM) system provided with a computer-aided-design (CAD) model of the workpiece. Accordingly, the method may also include comparing the virtually re-engineered workpiece with an ideal CAD model of the workpiece. As to this, comparing the virtually re-engineered workpiece with a computer-aided-design (CAD) model of the workpiece may primarily focus on comparing the simulated surface of the virtually re-engineered workpiece with the ideal surface of the CAD model of the workpiece.

According to an even more sophisticated application of the method, which may even enable for automatized quality analysis, the method may further include identifying deviations with regard to a pre-defined deviation range between the calculated tool path and the ideal tool path derived from the CAM system provided with the CAD model of the workpiece and/or identifying deviations with regard to a pre-defined deviation range between the virtually re-engineered workpiece and the CAD model of the workpiece.

As the method is preferably implemented on a cloud-based server and as the method/simulation may be continuously provided with the recorded realtime and non-realtime data during the ongoing machining process, the result of the above described quality analysis application may be available instantly or shortly after the machining process has been finished. Hence, information about the geometrical shapes, surfaces or the surface roughness of the workpiece may be available in-process or immediately after the machining process, respectively, yielding near "on-line" information about the quality of the workpiece.

Another application of the method according to the present invention may be used for virtual process control of the machining process. The basic principles of virtual process controls are: First, find a complete set of characteristic properties determining the process quality. Considering for example a milling CNC machine, milling forces, machine vibrations, tool vibrations, positioning accuracies, spindle speed, axes speeds, accelerations, jerks, bending moments of the mechanical components and error characteristics of the mechanical components as well as the state of the tools may be used as characterizing process parameter. The user may then define a quality window in which the process is supposed to be "good" and outside to be "not good". Considering again a milling CNC machine, a characterizing process parameter may be the milling force along the NC tool path. For a laser cutting machine, this may be the laser-power along the NC tool path. The respective process parameters data have to be recorded in real time over the full process under consideration, e.g., machine vibrations, milling forces or tool vibration. For some of the process parameters, additional external sensors have to be implemented for data recording. Hence, according to another preferred embodiment of the invention, the method may further include:

defining one or a plurality of process parameters out of the recorded realtime and non-realtime process data indicative for a pre-defined quality of the machining process and/or quality of the workpiece;

defining a quality range for the one or the plurality of process parameters with reference to the calculated and/or ideal tool path; and identifying deviations—with regard to the defined quality range—of the one or the plurality of process parameters with reference to the calculated and/or ideal tool path.

Again, also this information on the workpiece and the machining process may be available in-process or immediately after the machining process, respectively, because all data needed for the simulation is continuously and instantly provided, so to say "in realtime" or "on-line".

According to another embodiment of the invention, the method may further include visualizing the simulated machining process, in particular visualizing the calculated tool path; and/or
the ideal tool path; and/or
the virtually re-engineered workpiece; and/or
the CAD model of the workpiece; and/or
the comparison between the calculated tool path and the ideal tool path; and/or
the comparison between the virtually re-engineered workpiece and the CAD model of the workpiece; and/or
the identified deviations between the calculated tool path and the ideal tool path; and/or
the identified deviations between the virtually re-engineered workpiece and the CAD model of the workpiece; and/or
the one or the plurality of process parameters along or in reference to the calculated and/or ideal tool path; and/or
the identified deviations of the one or the plurality of process parameters along or in reference to the calculated and/or ideal tool path; and/or
the respective NC program code along or in reference to the calculated and/or ideal tool path; and/or
the CAM data, including machining strategies (e.g. cutting strategies), tool data, operation sequences for tool compensation, settings of smoothing functions, strategy for workpiece fixture, model data of the blank the workpiece is to be machined from, ideal tool path derived from the CAM system provided with the CAD model of the workpiece; and/or
the post processor data, in particular settings with regard to process-improving CNC functionalities, e.g. interpolation types, selection of speed and/or acceleration profiles, settings/selection of smoothing functions, tool orientation programming, interpolation functions, or machine error compensation methods; and/or
the CNC data, including settings with respect to machine error compensation methods and to the adaption of parameters, e.g. tolerances, jerk limits, for smoothing the tool paths, parameter settings for damping functions, data with respect to feed forward or momentum control.

Visualizing the status, i.e. the results of simulating, comparing and deviation identification, is a first level of the method according to the present invention, mainly for quality and process control. On this level, the system essentially does not provide any analytical intelligence. Further analytics and interpretation is mainly done by the human being user. However, having already the capability to visualize the data mentioned above—that are provided by the simulation and that base on realtime and non-realtime data recorded during the actual machining process—is a very powerful analysis tool as it allows to identify possible defects or quality issues on the machined part instantly or nearly instantly. Furthermore, as the recorded realtime and non-realtime data are preferably contextualized or mapped to each other, it is possible to identify possible reasons for the defects or quality issues on the machined part. For example, having the non-realtime data about the NC program and the realtime data about the tool path being contextualized, allows to allocate a possibly erroneous NC program line to a specific defect on the workpiece surface.

Since the NC program is contextualized with the other realtime and non-realtime data, in particular since the method according to the present invention may provide the respective NC program code along/in reference to the calculated and/or ideal tool path, the above mentioned engineering data may also be referred/mapped to the calculated and/or ideal tool path, and thus, referred/mapped to possible defects on the workpiece surface. This is due to the fact, that there is a one-to-one (geometrical) relation between the CAM and postprocessor data/output and the NC program. With regard to the CAD system, there is also a one-to-one (geometrical) relation, at least between the CAD model of the finished workpiece and the respective NC program part referring to the last machining sub-process leading to the finished workpiece.

Overall, the method may thus allow for identifying in the CAD system, the CAM system, the post processor, in the NC program, and in the CNC machine, in particular in the controller, in electrical drives, the actuators and the mechanical system of the CNC machine, reasons related to identified quality and process issues. Hence, the method according the present invention may provide a solution for a systematic error analysis and error elimination over the full process chain from the engineering via machining to the finished workpiece.

In particular, identifying possible reasons may be deduced by successive elimination of reasons using a rule-out or differential diagnosis approach. Hence, according to another preferred embodiment of the invention, the method further includes identifying in the CAD system, the CAM system, the post processor, in the NC program, and in the CNC machine, in particular in the controller, in electrical drives, the actuators and the mechanical system of the CNC machine, possible reasons related to the identified deviations between the virtually re-engineered workpiece and the CAD model of the workpiece; and/or reasons related to the identified deviations between the calculated tool path and the ideal tool path; and/or reasons related to the identified deviations of the one or the plurality of process parameters along the calculated and/or ideal tool path.

On a second level, analytical intelligence may be implemented into the method. Problematic areas are analyzed and the identified problems are shown to the user by visualizing the problem zones. For example with regard to the step of CAD, if complex bodies are joined using a huge number of primitives or if different surfaces are modeled, it is very likely that problems will occur. Typical phenomena are small steps, edges, gaps or multiple defined and overlapping regions mostly caused by numerical inaccuracies of the used algorithms. Other numerical inaccuracies and defects may cause fluctuations in the curvature of surfaces, point-shaped holes or other micro structural defects. In most cases, the problematic areas are not visible on the CAD model. Even high resolution visualization systems are not able to do this job. However, even such small defects on the size of a few pixels may result in difficulties within the subsequent by CAM process and finally on the machined workpiece. According to a particular embodiment of the invention, the method may be configured to detect and characterize these problem areas. For instance, steps or edges can be clearly identified looking at the continuity of the derivatives when moving along the surfaces. Such identified defects may be marked on the CAD model as problem area allowing the designer to check whether the problems result from algorithmic artefacts or whether they are real properties of the part design. This mainly applies to edges, steps or waves which might be intended or algorithmic artefacts. Here, the designer has to decide. However, it is important that the questionable regions are detected reliably by the analysis in a first step. In contrast, gaps or overlaps are easier to be treated because it is a priori clear that they are not intended. They only have to be visualized in order to enable the designer to solve the problem.

Yet, the consequences to be taken for further actions based on the analysis results are still subject to the user. Accordingly, on a third level, the method may further comprise remedying the identified reasons, wherein remedying the identified problems may include adapting the NC program code in order to eliminate programmed tool path errors; and/or adapting the geometry of the part program by changes of the CAM strategy in order to avoid critical machine vibrations or critical movements and to improve the overall dynamic behavior of the machine; and/or regarding a cutting machining process, changing the CAM strategy with regard to the relation between cutting depth, spindle speed and feed rate or other methods to improve cutting volume and/or quality; and/or changing at least one setting of a post processor used for converting the machine independent NC program code into a specific format of the controller of the CNC used for processing; and/or adapting an error compensation table of the CNC machine or activating an error compensation functionality of the controller of the CNC machine; and/or adapting at least one drive parameter in order to change the motion characteristics of the CNC machine; and/or activating a filter functionality, smoothing functions and/or other motion optimization functions of the controller of the CNC machine; and/or remedying problems of the CAD model such as bridging gaps between adjacent surfaces, removing overlaps of different surfaces or smoothing or slurring undesired steps in the CAD model.

A further aspect of the invention relates to a server of an internal network or of an open network, in particular to a cloud-based server or system, being configured to perform the method as claimed. A still further aspect of the invention relates to a server of an internal network or of an open network, in particular to a cloud-based server or system, having a method as claimed implemented thereon.

Further advantages and details of the present invention emerge by using the examples illustrated in the following text and in conjunction with the figures.

Figure 3A:
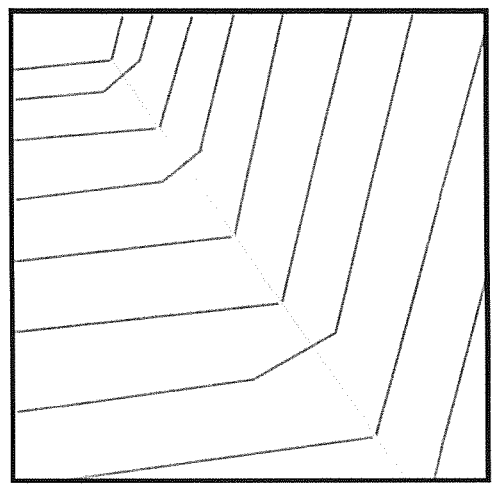
Figure 3B:
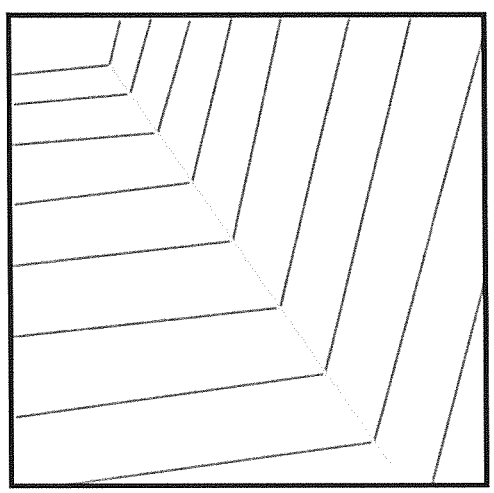
Figure 4A:
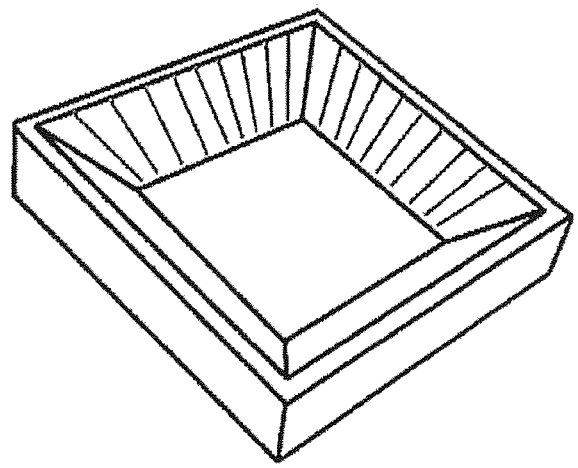
Figure 4B:
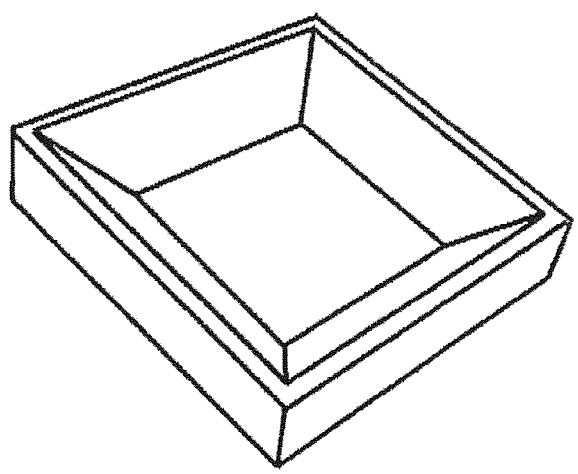

FIG. 3*a* shows a simulated tool path of a machining process derived by simulating the machining process under consideration by means of a digital machine model provided with realtime and non-realtime process data recorded during the machining process;

FIG. 3*b* shows the ideal tool path for the machining process of FIG. 3*a* derived from a CAM system provided with a CAD model of the workpiece;

FIG. 4*a* shows a virtual simulation of a workpiece derived from a re-engineering simulation according to the method of the present invention; and FIG. 4*b* shows the ideal CAD model of the workpiece corresponding to the workpiece of FIG. 4*a*.

Figure 1:
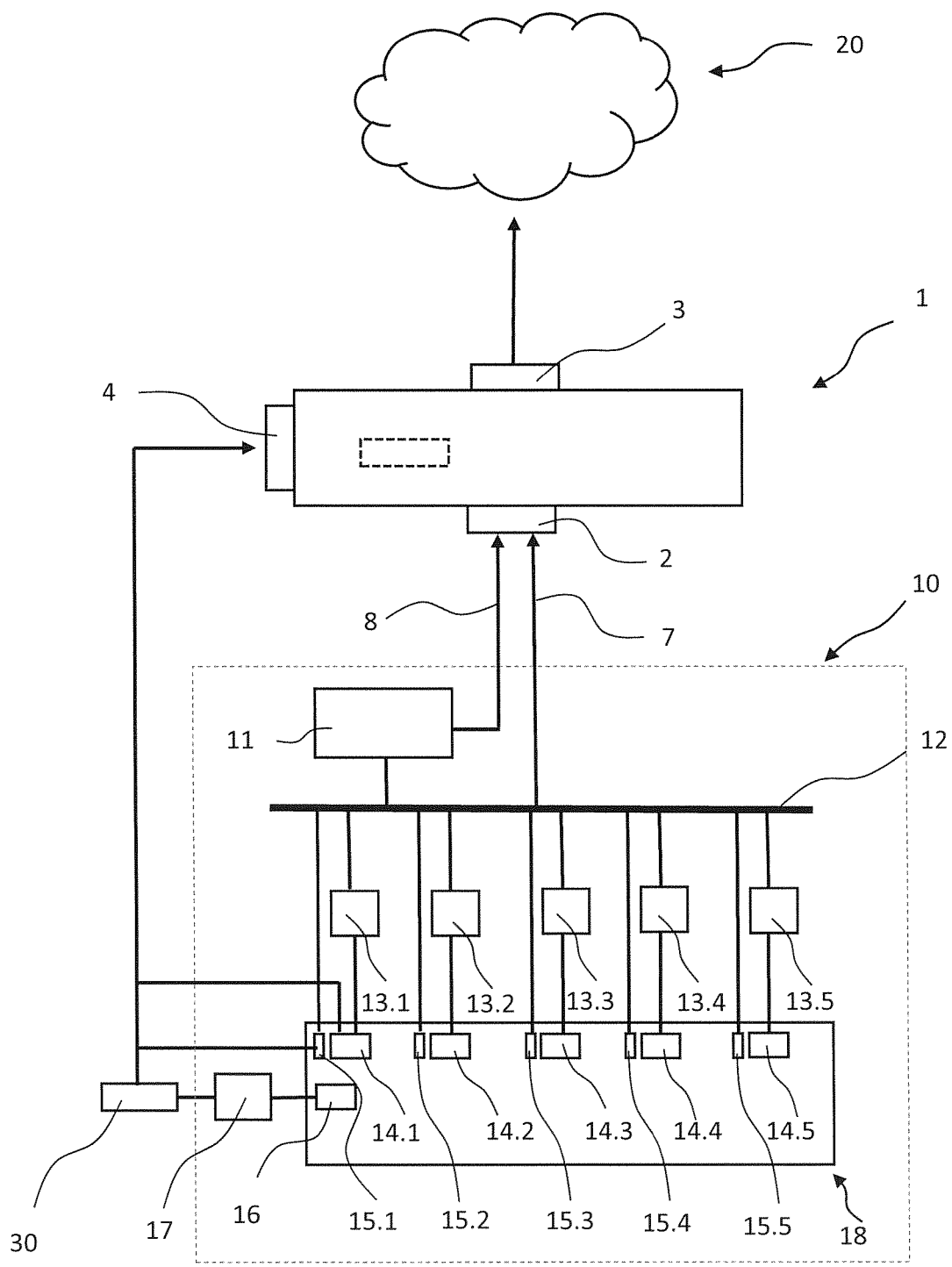
FIG. 1 illustrates an example of a system architecture for recording realtime and non-realtime process data of a CNC machine and for transferring said data a cloud-platform for data analysis using the method for part analytics according the present invention.

FIG. 1 schematically illustrates a system architecture for recording realtime and non-realtime process data of a CNC machine 10 and for transferring said data a cloud-platform 20 on which a part analytics method according the present invention may be implemented on. In the present example, the CNC machine 10 is a 5-axes milling center. The CNC machine 10 is operated by a CNC controller 11 and comprises electrical drives 13.1-13.5 for each actuator 15.1-15.5 of the respective machine axes. The machining of a specific workpiece by the CNC machine is based on machining commands of a corresponding NC program which are converted by the CNC machine 10 into machining actions, i.e. into movements of the actors 14.1-14.5 of the different machine axes and into a rotary movement of a spindle actuator 16 of the milling tool. These actuators belong to the mechanical/machining part 18 of the CNC machine 10. For this, the CNC controller 11 generates corresponding command values for each axis and the milling tool which are communicated via a local fieldbus 12 to the electrical drives 13.1-13.5 of all axes and the electrical spindle drive 17 of the spindle actuator 16. The fieldbus 12 is a realtime communication fieldbus used for the internal communication of the CNC machine 10 between the CNC controller 11 and the electrical drives 13.1-13.5, 17. The machine-embedded measuring devices/sensors 15.1-15.5 used for measuring the actual positions of each axis may also be connected to the fieldbus 12. In order to control the movement along each axis, the machine-embedded measuring devices 15.1-15.5, e.g. high-resolution linear scales, are continuously measuring the actual position for feedback via the fieldbus 12 to the CNC controller 11.

The CNC machine is connected to the a client device 1 as disclosed in the US provisional patent application U.S. 62/073,398, titled "Big Data-Client for Embedded Systems", and as disclosed in the international patent application under PCT, titled "A client device for data acquisition and pre-processing of process-related mass data from at least one CNC machine or industrial robot", filed on Oct. 30, 2015 by the same applicant as of U.S. 62/073,398 and the present application. The client device 1 is configured for recording and pre-processing of process-related mass data from the CNC machine 10 as well as for transmitting said process-related mass data to the cloud-platform 20 for data analysis using the part analytics method according the present invention. For this, the client device 1 comprises a first data communication interface 2 to the CNC controller 11 of the CNC machine 10 for continuously recording realtime process data via a realtime data channel 7 and for recording non-realtime process data via at least one non-realtime data channel 8. The recorded realtime process data may primarily include tool path parameters, in particular at least one of a commanded and/or actual position, a commanded and/or actual speed, a commanded and/or actual acceleration, a commanded and/or actual jerk, a commanded and/or actual torque, a commanded and/or actual drive force and/or a commanded and/or actual drive current with regard to at the drive axes. In addition, the realtime data may comprise data from external measuring devices attached to the CNC machine 10. Referring to FIG. 1, a force-sensor 30 is installed in the spindle actuator 17 of the milling tool 16 that is directly connected to the client device 1 via the further data interface 4. Having access to these milling force data may enable a specific application on the cloud-based server 20 to identify process issues related to e.g. an overload of the milling tool.

The recorded non-realtime process data may include the NC program code, machine configuration data, controller configuration data, drive configuration data, material properties of the workpiece, user actions during the machining process and/or configuration data of the processing tool, in particular tooling geometry and/or tooling characteristic.

To make the recorded realtime and non-realtime data available for recording, a data providing function may be implemented in the CNC controller 11. The client device 1 further comprises a second data communication interface 3 for transmitting the recorded process data to the cloud-platform 20. The client device is also configured to pre-process the recorded data before transmission to the server 20, in particular to contextualize the recorded non-realtime data to the recorded realtime data as described above.

Figure 2:
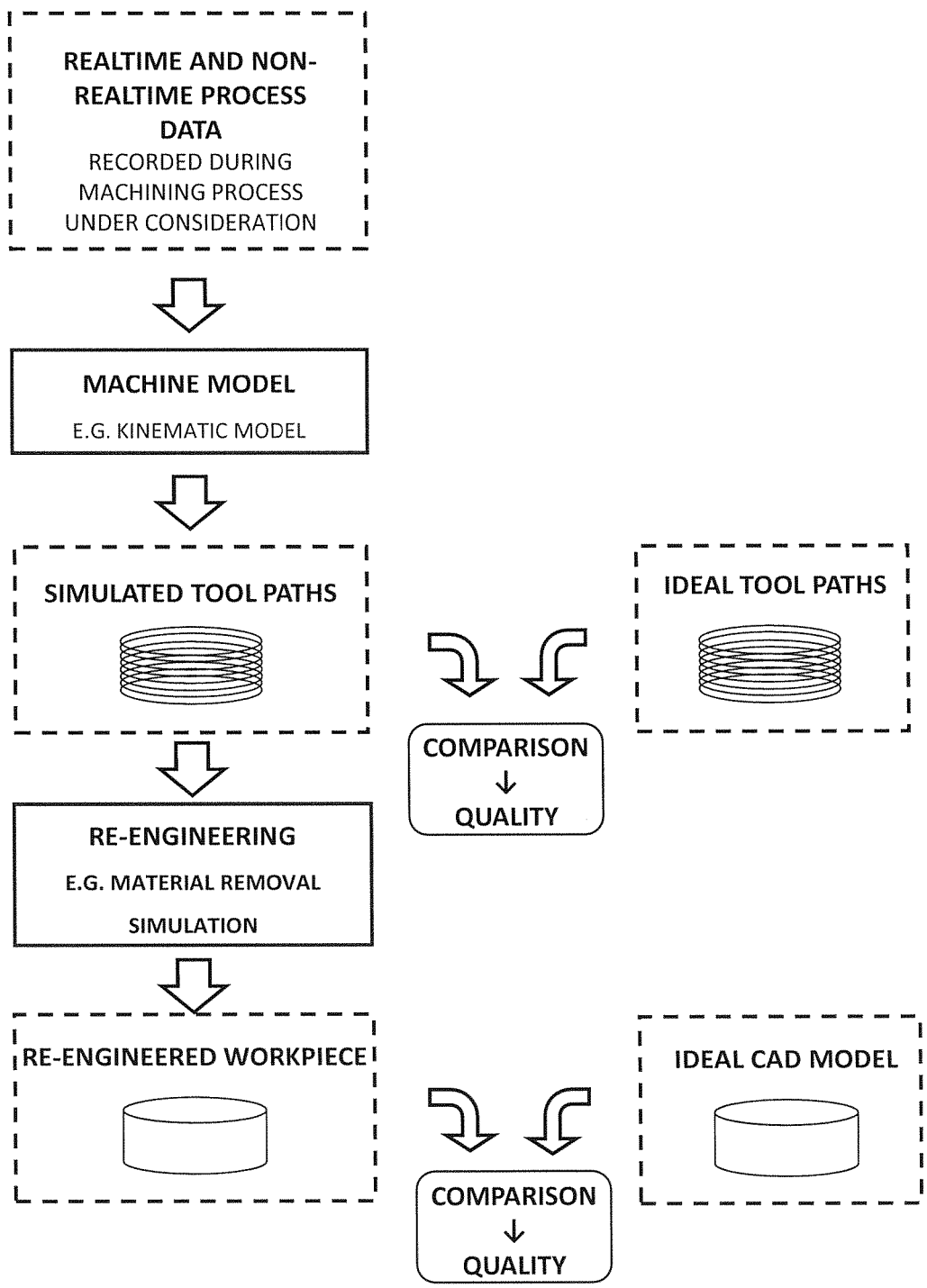
FIG. 2 illustrates an exemplary embodiment of the method for part analytics according the present invention.

FIG. 2 illustrates an exemplary embodiment of the method according the present invention used for analyzing the quality and the machining process of a workpiece machined by the CNC machine 10 as shown in FIG. 1. The basic idea is to provide a digital machine model of the CNC machine 10 with realtime and non-realtime process data as mentioned above that have been recorded during the machining process of the workpiece and to subsequently simulate the machining process by means of the digital machine model based on the recorded realtime and non-realtime process data. As shown in FIG. 1, the realtime and non-realtime process data mentioned above are transferred to the cloud-based server 20 by the client device 1 after being recorded and pre-processed. The method according to the invention is implemented as server application residing on the cloud-based server 20. There, the recorded data are provided to a digital machine model of the CNC machine 10 for simulating the machining process based on the recorded process data reflecting the actual machining process. The digital machine model may be a multibody-simulation model, a FEM model or just a pure geometric kinematic model of the CNC machine 10.

As a first stage of simulation, simulating the machining process may include calculating the actual tool path of the processing tool of the CNC machine 10. Most easily, the actual tool path may be calculated by providing a kinematic model of the CNC machine with the actual positions of the drive axes used to move the processing tool recorded during the machining process. The calculated or simulated tool path derived from the simulation may be visualized to the user as depicted in FIG. 2. For further analysis, this simulated tool path may be compared with an ideal tool path derived from a CAM system provided with a CAD model of the workpiece (see FIG. 2).

FIGS. 3a and 3b illustrate another example for this first stage of simulation, showing tool path details at the edge of a workpiece. While FIG. 3a corresponds to the visualization of the calculated tool path derived from a simulation using a digital machine model and recorded process data, FIG. 3b is a visualization of the ideal tool path derived from a CAM system referring to the same detail of the workpiece. As can be deduced by a direct comparison of FIG. 3a and FIG. 3b, the method immediately yields tool path errors with regard to the real machining process which may possibly cause defects on the machined workpiece as compared to the target workpiece or CAD model, respectively.

As a second stage of simulation, the method may include virtually re-engineering the machined workpiece, in particular its surface, based on the realtime and non-realtime process data recorded during the machining process. Comparing the re-engineered workpiece with an ideal CAD model of the same workpiece, immediately allows to apply a quality analysis of the actually machined workpiece as will be described in the following with regard to a milling process (see FIG. 2).

Re-engineering a workpiece machined by a milling machine can be realized by first calculating the tool path of the milling tool based in a digital machine model provided with realtime and non-realtime process data recorded during the machining process as described above. Subsequently, the geometry and milling characteristic of the milling tool has to be considered in order to re-engineer the workpiece surfaces along the simulated tool paths. This virtual re-engineering may be simply accomplished by material removal simulation as known from prior art. This re-engineering yields a virtual surface of the actually machined workpiece.

FIG. 4a shows such a re-engineered workpiece. In contrast, FIG. 4b shows a CAD model of the same workpiece or in other, the ideal part. The re-engineered surfaces may now be compared with the ideal surfaces generated by the CAD-model. As can be seen, the re-engineered part in FIG. 4a shows geometrical inaccuracies of the surface on the walls, which are probably due to an inadequate approximation of the tool orientation interpolation. This means that the movement of the axes orientation was not smooth enough to avoid this type of surface quality issue.

The above described method bases on the "on-line" (parallel to machining) recording of the real tool path of the machine movement instead of offline measuring the machined part after machining. Hence, as the method is preferably implemented on a cloud-based server, the result of the above described quality analysis application may be available nearly instantly or shortly after the machining process has been finished. Hence, information about the geometrical shapes and surfaces or surface roughness of the workpiece may be available in-process or immediately after the machining process, respectively, thus yielding instantly information about the quality of the workpiece.

As described above, the simulation/digital machine model is also provided with process data other than those primarily used to simulate the tool path and the surface of the workpiece. Those other data are preferably mapped to the tool path data. Referring to FIG. 1, realtime data from the external force-sensor 30 may be mapped to realtime data on the actual position of the drive axes. Due to this contextualization, the method according to the present example may e.g. visualize/display/provide the recorded realtime milling force data with regard to the corresponding point on the simulated or ideal tool path or the superposition of both tool paths. The same date may also be visualized/displayed/provided with regard to the corresponding point on the re-engineered or ideal surface of the workpiece or the superposition of both. Doing so, a user of this method is provided with a powerful tool to identify possible defects on the workpiece surface and to relate these defects to specific process issues, e.g. an overload of the milling tool. Analogously, providing the same method with NC program code recorded during the machining process and properly mapped to the recorded tool path parameters allows e.g. to allocate a possibly erroneous NC program line to a possible defect on the workpiece surface. Hence, the method according to the present invention does not only allow for an "on-line" quality analysis, but also for an "on-line" process analysis of the machining process.

Due to the one-to-one relation between the NC program data and post processor, CAM and CAD data as described above, the part analysis may be easily extended over the full process chain in order to identify reasons for possible quality issues in the CAD system, the CAM system, the post processor, in the NC program, and in the CNC machine, in particular in the controller, in electrical drives, the actuators and the mechanical system of the CNC machine.

What is claimed:

1. A computer-implemented method having computer-executable instructions for performing part analytics of a workpiece machined by at least one CNC (Computer Numerical Control) machine, the method comprising:
   a. sending, to the at least one CNC machine, first instructions for machining the work piece under consideration, wherein the first instructions are based on a first digital model of the workpiece;
   b. receiving, by a digital machine model of the CNC machine, realtime and non-realtime process data of the at least one CNC machine, the realtime and non-realtime process data having been recorded during the machining process, based on the first instructions, of the workpiece under consideration;
   c. simulating the machining process under consideration by means of the digital machine model based at least partially on the recorded realtime and non-realtime process data;
   d. identifying deviations between the simulated machining process and the first instructions;
   e. generating, based on the identified deviations, second instructions for continued machining of the workpiece under consideration; and
   f. sending, to the at least one CNC machine, the second instructions,
   wherein the recorded realtime process data comprises a measured force experienced, during the machining process of the workpiece under consideration, by at least one part of the CNC machine, and
   wherein the measured force comprises one or more of a measured bending force, a measured strain, a measured torque, a measured vibration, a measured pressure, or a measured torsion.

2. The method according to claim 1, wherein the recorded realtime process data further comprises:
   tool path parameters of at least one processing tool, and
   one of a process-related temperature, energy distribution, or energy consumption of at least one part of the CNC machine.

3. The method according to claim 1, wherein the recorded non-realtime process data include one or more of:
   a NC (Numerical Control) program code and/or NC program configuration data; or
   machine configuration data, drive configuration data and/or controller configuration data; or
   material properties of the workpiece; or
   user actions during the machining process; or
   configuration data of a processing tool.

4. The method according to claim 1, wherein the recorded realtime and non-realtime process data are provided by one or more of:
   at least one controller of the CNC machine; or
   at least one electrical drive and/or actuator of the CNC machine used to drive a processing tool with regard to a respective linear or rotary drive axis; or
   at least one machine-embedded measuring device of the CNC machine; or
   at least one external measuring device monitoring at least one process parameter of the CNC machine.

5. The method according to claim 1, wherein the method further comprises recording the realtime and non-realtime process-related data prior to providing the digital machine model.

6. The method according to claim 1, wherein the method further includes providing engineering data of the workpiece to be machined, the engineering data comprising one or more of:
   CAD data, including a CAD model of the workpiece; or
   CAM data, including machining strategies, tool data, operation sequences for tool compensation, settings of smoothing functions, strategy for workpiece fixture, model data of the blank the workpiece is to be machined from, ideal tool path derived from the CAM system provided with the CAD model of the workpiece; or post-processor data; or CNC data, including settings with respect to machine error compensation methods and to the adaption of parameters, including one or more of tolerances, jerk limits for smoothing the tool paths, parameter settings for damping functions, data with respect to feed forward or momentum control.

7. The method according to claim 1, wherein the method further comprises pre-processing of the recorded realtime and non-realtime process-related data prior to providing the digital machine model, wherein preprocessing comprises one or more of contextualizing, compressing, encrypting, aggregating, filtering, or reformatting the recorded realtime and non-realtime process data.

8. The method according to claim 1, wherein simulating the machining process of the CNC machine is implemented as a server application on at least one server of an internal network or of an open network, wherein the recorded realtime and non-realtime process data and the engineering data are sent to the server.

9. The method according to claim 1, wherein the machine model is a kinematic model, a multibody-simulation model or a finite-element-method (FEM) model of the CNC machine.

10. The method according to claim 1, wherein the method further includes individualizing and/or calibrating the digital machine model with regard to the actual configuration of the specific CNC machine prior to using the digital machine model for simulating the machining process.

11. The method according to claim 1, wherein simulating the machining process includes calculating the tool path of a processing tool of the CNC machine by means of the digital machine model based at least partially on the recorded realtime and non-realtime process data.

12. The method according to claim 7, wherein simulating the machining process includes virtually re-engineering the workpiece machined during the recorded machining process based at least partially on the recorded realtime and non-realtime process data.

13. The method according to claim 12, wherein virtually reengineering the workpiece is based on a material removal simulation or on a material addition simulation.

14. The method according to claim 11, wherein the method further includes one or more of:
comparing the calculated tool path with an ideal tool path derived from a computer-aided manufacturing (CAM) system provided with a computer-aided-design (CAD) model of the workpiece; or
comparing the virtually re-engineered workpiece with a computer-aided-design (CAD) model of the workpiece.

15. The method according to claim 14, wherein identifying deviations further includes identifying deviations with regard to a pre-defined deviation range between the calculated tool path and the ideal tool path derived from the CAM system provided with the CAD model of the workpiece and/or identifying deviations with regard to a pre-defined deviation range between the virtually re-engineered workpiece and the CAD model of the workpiece.

16. The method according to claim 11, wherein the method further includes:
defining one or a plurality of process parameters out of the recorded realtime and non-realtime process data indicative for a pre-defined quality of the machining process and/or quality of the workpiece; and
defining a quality range for the one or the plurality of process parameters along/with reference to the calculated and/or ideal tool path, wherein identifying deviations further comprises identifying deviations with regard to the defined quality range of the one or the plurality of process parameters along/with reference to the calculated and/or ideal tool path.

17. The method according to claim 6, wherein the method further includes visualizing the simulated machining process by visualizing one or more of:
the calculated tool path; or
the ideal tool path; or
the virtually re-engineered workpiece; or
the CAD model of the workpiece; or
the comparison between the calculated tool path and the ideal tool path; or
the comparison between the virtually re-engineered workpiece and the CAD model of the workpiece; or
the identified deviations comprise deviations between the calculated tool path and the ideal tool path; or
the identified deviations comprise deviations between the virtually reengineered workpiece and the CAD model of the workpiece; or
the one or the plurality of process parameters along/in reference to the calculated and/or ideal tool path; or
the identified deviations comprise deviations of the one or the plurality of process parameters along/in reference to the calculated and/or ideal tool path; or
the respective NC program code along/in reference to the calculated and/or ideal tool path;
the CAD data, including a CAD model of the workpiece; or
the CAM data, including machining strategies, tool data, operation sequences for tool compensation, settings of smoothing functions, strategy for workpiece fixture, model data of the blank the workpiece is to be machined from, ideal tool path derived from the CAM system provided with the CAD model of the workpiece; or
the post processor data; or
the CNC data, including settings with respect to machine error compensation methods and to the adaption of parameters, including one or more of tolerances, jerk limits for smoothing the tool paths, parameter settings for damping functions, data with respect to feed forward or momentum control.

18. The method according to claim 15, wherein the method further includes identifying one or more of:
possible reasons related to the identified deviations between the virtually re-engineered workpiece and the CAD model of the workpiece; or
possible reasons related to the identified deviations between the calculated tool path and the ideal tool path; or
possible reasons related to the identified deviations of the one or the plurality of process parameters along the calculated and/or ideal tool path.

19. The method according to claim 18, wherein identifying possible reasons are deduced by successive elimination of reasons using a rule-out or differential diagnosis approach.

20. The method according to claim 18, wherein the method further comprises remedying the identified reasons.

21. The method according to claim 20, wherein remedying the identified problems includes one or more of:
adapting the NC program code in order to eliminate programmed tool path errors; or
adapting the geometry of the part program by changes of the CAM strategy in order to avoid critical machine vibrations or critical movements and to improve the overall dynamic behavior of the machine; or regarding a cutting machining process, changing the CAM strategy with regard to the relation between cutting depth, spindle speed and feed rate or other methods to improve cutting volume and/or quality; or changing at least one setting of a post processor used for converting the machine independent NC program code into a specific format of the controller of the CNC used for processing; or adapting an error compensation table of the CNC machine or activating an error compensation functionality of the controller of the CNC machine; or adapting at least one drive parameter in order to change the motion characteristics of the CNC machine; or activating a filter functionality, smoothing functions and/or other motion optimization functions of the controller of the CNC machine; or remedying problems of the CAD model such as bridging gaps between adjacent surfaces, removing overlaps of different surfaces or smoothing or slurring undesired steps in the CAD model.

\* \* \* \* \*